United States Patent [19]

Smith

[11] Patent Number: 5,193,152
[45] Date of Patent: Mar. 9, 1993

[54] NETWORK MANAGEMENT SYSTEM WITH GROUP NAMING

[75] Inventor: Daniel L. Smith, Sunrise, Fla.
[73] Assignee: Racal-Datacom, Inc., Sunrise, Fla.
[21] Appl. No.: 875,004
[22] Filed: Apr. 24, 1992

Related U.S. Application Data

[63] Continuation of Ser. No. 431,416, Nov. 3, 1989, abandoned.

[51] Int. Cl.⁵ .......................................... H04L 12/24
[52] U.S. Cl. ........................... 395/200; 364/242.94; 364/282.1; 364/286.1; 364/DIG. 1
[58] Field of Search ............... 340/825.47; 370/85.3, 370/85.4, 85.5, 85.13, 85.14, 94.1, 94.2; 395/200

[56] References Cited

U.S. PATENT DOCUMENTS

| | | | |
|---|---|---|---|
| 4,131,881 | 12/1978 | Robinson | 340/107 R |
| 4,245,306 | 1/1981 | Besemer et al. | 395/325 |
| 4,385,384 | 5/1983 | Rosbury et al. | 371/22 |
| 4,695,880 | 9/1987 | Johnson et al. | 358/86 |
| 4,760,572 | 7/1988 | Tomikawa | 370/94 |
| 4,792,947 | 12/1988 | Takiyasu et al. | 370/86 |
| 4,821,184 | 4/1989 | Clancy et al. | 395/425 |
| 4,933,938 | 6/1990 | Sheehy | 370/85.13 |
| 4,969,147 | 11/1990 | Markkula, Jr. et al. | 370/94.1 |
| 5,034,882 | 7/1991 | Eisenhard et al. | 395/656 |

OTHER PUBLICATIONS

Racal-Milgo's CMS 2000 Network Management System.

*Primary Examiner*—Dale M. Shaw
*Assistant Examiner*—Lance Leonard Barry
*Attorney, Agent, or Firm*—William A. Newton

[57] ABSTRACT

A method and apparatus for providing for arbitrary definintion of groups in a data communication network management system. Groups are added, modified, merged, deleted or displayed as desired by the user so that all members of the arbitrarily defined group can be addressed as a group, for example to do a self test and report results. Collectives can be defined as members of the group and the collectives can be unpacked at the time of issuance of a command rather than at the time of creation of the group so that changes to the collective are reflected as changes to the group automatically. Provision is made for creating groups which are commonly desired and significant group configuration activity is logged to either a printer or a file.

3 Claims, 10 Drawing Sheets

NETWORK MANAGEMENT SYSTEM WITH GROUP NAMING

This is a continuation of copending application Ser. No. 07/431,416 filed on Nov. 3, 1989, now abandoned.

BACKGROUND

1. Field of the Invention

This invention relates generally to the field of network management systems for data communications networks. More particularly, this invention relates to a user defined group configuration function in such network management systems.

2. Background of the Invention

Commercially available data communications network management systems have been used for a number of years to enable an operator to manage a large group of objects within a data network. Such objects include modems, multiplexers, Digital Service Units (DSU's), encryption devices, packet switches, etc. An example of such a system is shown in U.S. Pat. No. 4,385,384 to Rosbury et al which is hereby incorporated by reference. Such network management systems typically allow a user to define certain information about the network in an integral database which is used in the network management function. It is typical for such databases to keep track of information such as location of the object, type of object, object ID, and interconnection information relating to the object (i.e. what other objects are connected to the object in question).

In the commercially available CMS 2000 TM network management system produced by Racal-Milgo, a user is able to obtain certain information regarding certain sites, domains, circuits and diagnostic channels for generation of reports or displays and the like. In addition, by addressing a command to a predetermined global address, the command can be received and acted upon by all units on a particular diagnostic channel. It would be desirable to provide for arbitrary definition of groups of objects so that the user has the ability to create groups which might not be contemplated by the designer of the network management system. The present invention provides such a mechanism.

Consider for example the following table (TABLE 1) of selected information regarding several network objects and the associated scenarios described below (remembering that a typical network may include hundreds or thousands of such objects:

TABLE 1

| TYPE | ID | MFG. | DATE | DTE |
|---|---|---|---|---|
| modem | 14 | XYZ | 10/87 | terminal |
| modem | 16 | XYZ | 3/89 | terminal |
| modem | 18 | XYZ | 3/89 | terminal |
| modem | 20 | XYZ | 7/89 | teller |
| modem | 22 | ABC | 5/89 | teller |
| multiplexer | 24 | XYZ | 3/88 | terminals |
| multiplexer | 26 | XYZ | 3/88 | terminals |
| multiplexer | 28 | ABC | 9/87 | terminals |

It may be desirable for the network management operator to be able to tell at any time which network objects are manufactured by ABC. It would therefore be desirable to create a special group within the database of all ABC manufactured objects. This could be useful for simple inventory purposes as well as diagnosing particular peculiarities of devices of a single manufacturer. In this small example, devices 22 and 28 would be in this group.

It may be desirable for the network management operator to determine which objects are connected to automated teller machines. This group would be objects 20 and 22. By finding the intersection of this group and the group of all ABC devices, the operator may detect problems peculiar to interfacing ABC modems to teller machines.

In another example, it may be useful to group together all XYZ modems manufactured prior to 4/89 (14, 16 and 18) in the event that a minor design change causes these devices to perform differently in some way. For example, suppose they behave differently at lower temperatures or have a "bug" in their internal firmware. These devices can then be dealt with as a group by the operator as required.

In addition to these examples, it may be desirable for other otherwise arbitrary groups to be collectively addressable by the user. For example, all objects of a particular type or types (model from a given manufacturer), class, speed, purchase date, diagnostic circuit, circuit connection, priority of service, etc. The present invention provides for such arbitrary groupings of devices so that using conventional database technology, this group can be collectively addressed as a group by the user for any appropriate function (e.g. request all units in a particular group to perform a loopback test).

In existing known network management systems, creation of such user defined groups is not possible. In general, the internal database used by the network management system is designed specifically to do only the tasks defined at the time of the design. If the design team sees no reason to define, for example, a group of devices manufactured prior to a particular date, no provision may be made for addressing those devices as a group for management and diagnostic functions. In fact, it is unlikely that there is a mechanism for encoding such a date in a typical system unless done through serial numbers which can be correlated to dates.

The present invention alleviates this problem by providing the user with a mechanism for arbitrarily defining groups of network objects to address as a group for network management and diagnostic or other functions.

SUMMARY OF THE INVENTION

It is an object of the present invention to provide an improved network management system having capabilities for addressing an arbitrary group of network objects.

It is an advantage of the invention that any user defined group can be established as the user sees fit.

These and other objects and advantages of the invention will become apparent to those skilled in the art upon consideration of the following description of the invention.

In preferred embodiments of the present invention, a method and apparatus for provides for arbitrary definition of groups in a data communication network management system. Groups are added, modified, merged, deleted or displayed as desired by the user so that all members of the arbitrarily defined group can be addressed as a group, for example to do a self test and report results. Collectives can be defined as members of the group and the collectives can be unpacked at the time of issuance of a command rather than at the time of creation of the group so that changes to the collective are reflected as changes to the group automatically.

Provision is made for creating groups which are commonly desired and significant group configuration activity is logged to either a printer or a file.

In one embodiment a computer based data communications network management system for managing a plurality of network objects, a method is disclosed for allowing a user to define a group of objects according to any user defined criteria for addressing as a group. This method includes the steps of: creating a name for the group to be used in addressing the group; generating a list associated with the label of the network objects to be included in the group; and storing the list along with its associated label in a database.

In a network management system according to the present invention, a method is disclosed for addressing a group of objects in a network of such objects. This method includes the steps of: getting a command from a user, the command including a group name as a destination for the command; unpacking the group to identify the individual members of the group; creating an individual command for each the unpacked individual member of the group; and issuing each the individual command to each the individual member of the group.

Preferably the creating step further includes the steps of obtaining identities of each member of the group from a database table; determining that a collective is listed on the database table as a member of the group; and unpacking the collective to determine the individual members of the group.

The features of the invention believed to be novel are set forth with particularity in the appended claims. The invention itself, however, both as to organization and method of operation, together with further objects and advantages thereof, may be best understood by reference to the following description taken in conjunction with the accompanying drawing.

DETAILED DESCRIPTION OF THE INVENTION

Figure 1:
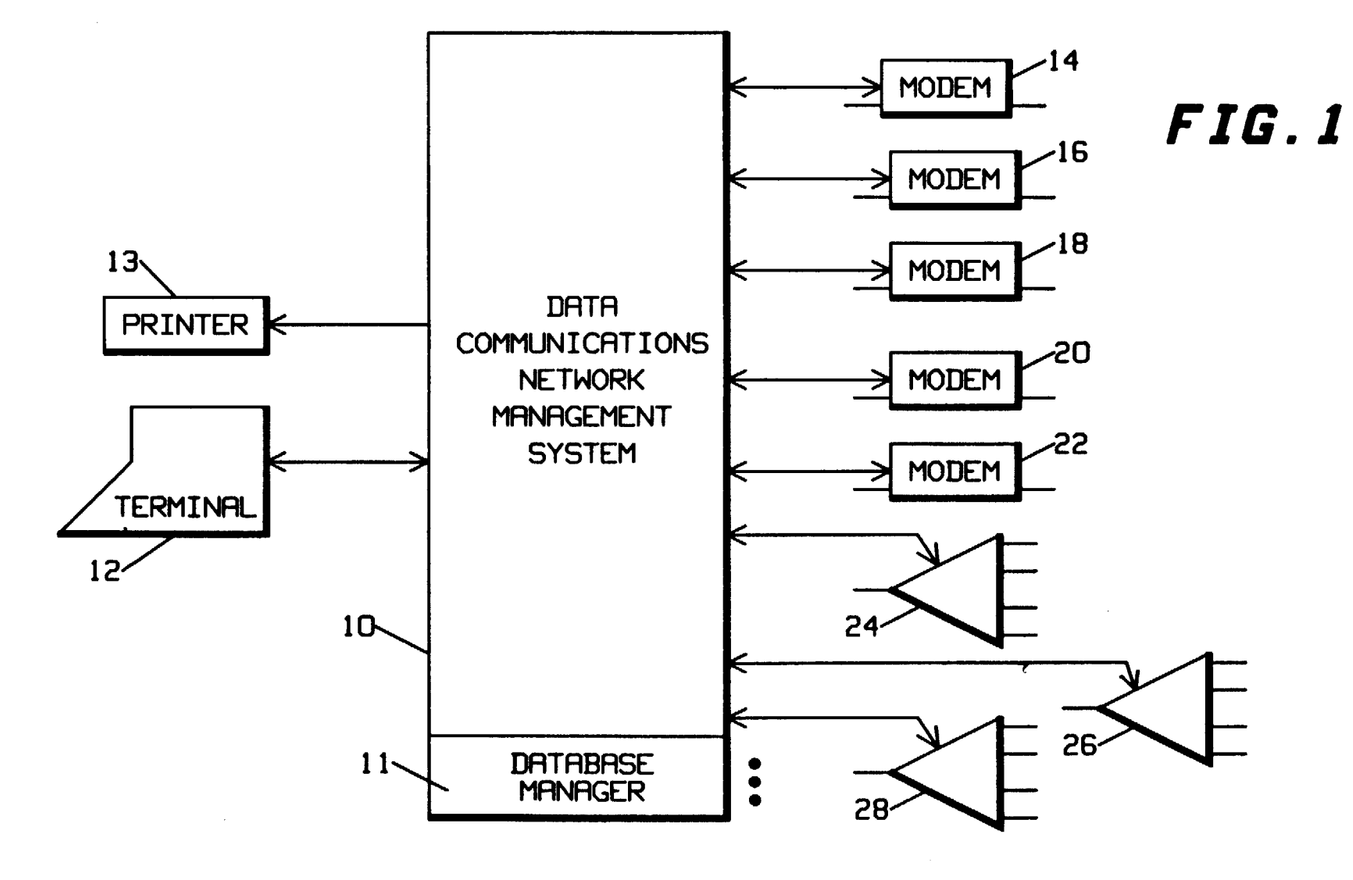
FIG. 1 shows a high level block diagram of a network management system.

Turning now to the drawing in which like reference numerals designate corresponding parts or functions throughout the several figures thereof, and in particular to FIG. 1 thereof, there is shown a network management system 10 having an integral database management system 11 such as the ORACLE TM relational database management system produced by Oracle Corp. A user terminal 12 is attached to the system in a known manner to provide for a user interface to the system. A printer 13 may also be attached to the system to provide a log of activities. The network management system 10 may be based upon a minicomputer, microcomputer or other suitable host as is conventional and includes an operating system such as UNIX TM as well as RAM memory and disk storage (not shown explicitly). In the preferred implementation, a DECstation 3100 TM RISC workstation manufactured by Digital Equipment Corp. is used.

The network management system 10 is connected either directly or indirectly through communications channels to various network objects as previously described. This connection can be viewed conceptually for purposes of this disclosure as direct connections as shown. The objects shown in FIG. 1 correspond to the small set of objects described in TABLE 1 above and include modems 14, 16, 18, 20 and 22; and multiplexers 24, 26 and 28. These devices are interconnected, in general with many other devices, in a data communication network which is not shown for simplicity.

In use, the user of the network management system 10 may communicate via terminal 12 with the various modems, multiplexers and in general other network objects (sometimes referred to herein as units) in order to obtain status or functional information, to attempt to locate malfunctions, to switch in redundant equipment and in general monitor the state of the network. The present invention allows the user to, for example, inquire as to the operational status of a particular user defined group of network objects by simply referring to the group by a user defined name (group id).

With reference to the flow charts to be described below, it will be understood by those skilled in the art that these flow charts include only minimal error trapping so that the invention can be readily understood without undue burden of known error trapping techniques. Those skilled in the art will understand how to use such error trapping techniques as required to attempt to assure that only valid entries are made and the like. In most instances, the user can leave a procedure to get to the next higher level by use of an exit key or escape key, the status of which is continually monitored by the system. Other escape mechanisms can be implemented in alternative embodiments without departing from the present invention.

Figure 2:
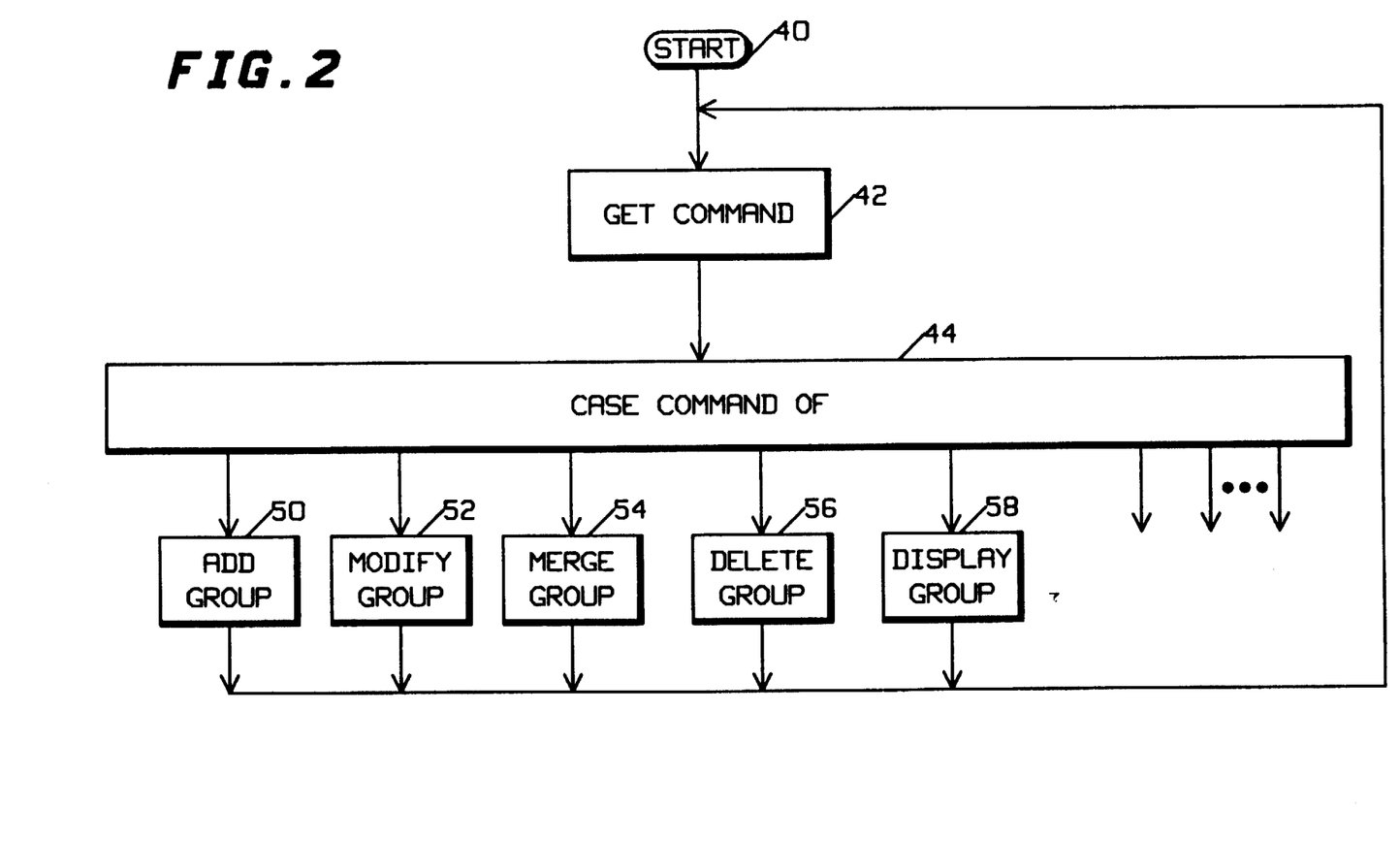
FIG. 2 shows a high level flow chart of the group configuration operation.

Turning now to FIG. 2, a high level command structure is represented in flow chart form. The user may perform group configuration functions by making appropriate selections from a menu presented by the network management system 10 or may directly enter commands to invoke group configuration functions. Five such functions are shown, but others may occur to those skilled in the art. The user's menu selections may be made either by highlighting a selection with cursor movement keys from a keyboard or may be implemented such that the user can point to the selection using a pointing device such as a mouse as desired.

The process starts at 40 and, after appropriate initialization of the system, the user selects a command from the menu (or perhaps may type a command) at step 42. At 44, the command is examined and a case function is performed to determine what action to take as a result of the user's selection. The user may select from functions add group 50, modify group 52, merge group 54, delete group 56 and display group 58. Other group related functions may also be available to the user. The group configuration functions may be selected individually from a large group of functions or may be selected from a second layer of menus descending from a high level menu. Other logical arrangements for placement of the group configuration functions will occur to those skilled in the art. After the procedure associated with the menu selection is completed, control loops back to the menu at 42.

Each function is described later in detail along with a flow chart of its operation. A brief description of each function is provided as a preliminary introduction below:

Add group—This function allows a user to define a group. the definition includes defining a group id (a name for the group) which is unique throughout the system and identifying the members of the group.

Modify group—This function allows the user to change the definition of an existing group. The user may change the group id of the group as well as add or remove members from the group.

Merge group—This function allows the user to merge the contents of two groups into one group by specifying the group id's of the two groups which are to be merged.

Delete group—This function allows the user to delete an existing group after requiring confirmation.

Display group—This function allows the user to display a list of all defined groups and / or display the members of any particular group.

Those skilled in the art will appreciate that once the capability of establishment of such groups is provided, other database type operations such as union, intersection, etc. may be performed on the groups and may be provided as individual menu selections if desired.

In the preferred embodiment, two database tables in addition to the tables normally used in a relational database are used to hold the group information: a group definition table and a group member definition table. TABLE 2 below shows an example of the group definition table and TABLE 3 below shows an example of the group member definition table.

TABLE 2

| INTERNAL GROUP ID | EXTERNAL GROUP ID | COMMENT |
|---|---|---|
| 103 | OMNI-GROUP | GROUP OF ALL OMNIMODE MODEMS |
| 104 | NE-GROUP | GROUP OF ALL MODEMS AT NORTHEAST REGION SALES OFFICE |

TABLE 3

| INTERNAL GROUP ID | MEMBER TYPE | UNIT ID |
|---|---|---|
| 103 | 1 | 203 |
| 103 | 1 | 205 |
| 103 | 1 | 207 |
| 103 | 1 | 219 |
| 103 | 1 | 233 |
| 103 | 1 | 231 |
| 103 | 1 | 217 |
| 104 | 3 | 301 |

The system uses an internal group id which is a numerical code for internal processing by the system. The external group id is the name assigned by the user. The comment field, as will be described later, is used by the user to comment on the group. The member type determines whether the table entry is an individual object, another group, a channel, a site, a domain or a circuit as will be discussed in more detail later. The unit id is a code which identifies each individual object or in the case of a group, channel, site, domain or circuit uniquely.

Figure 3:
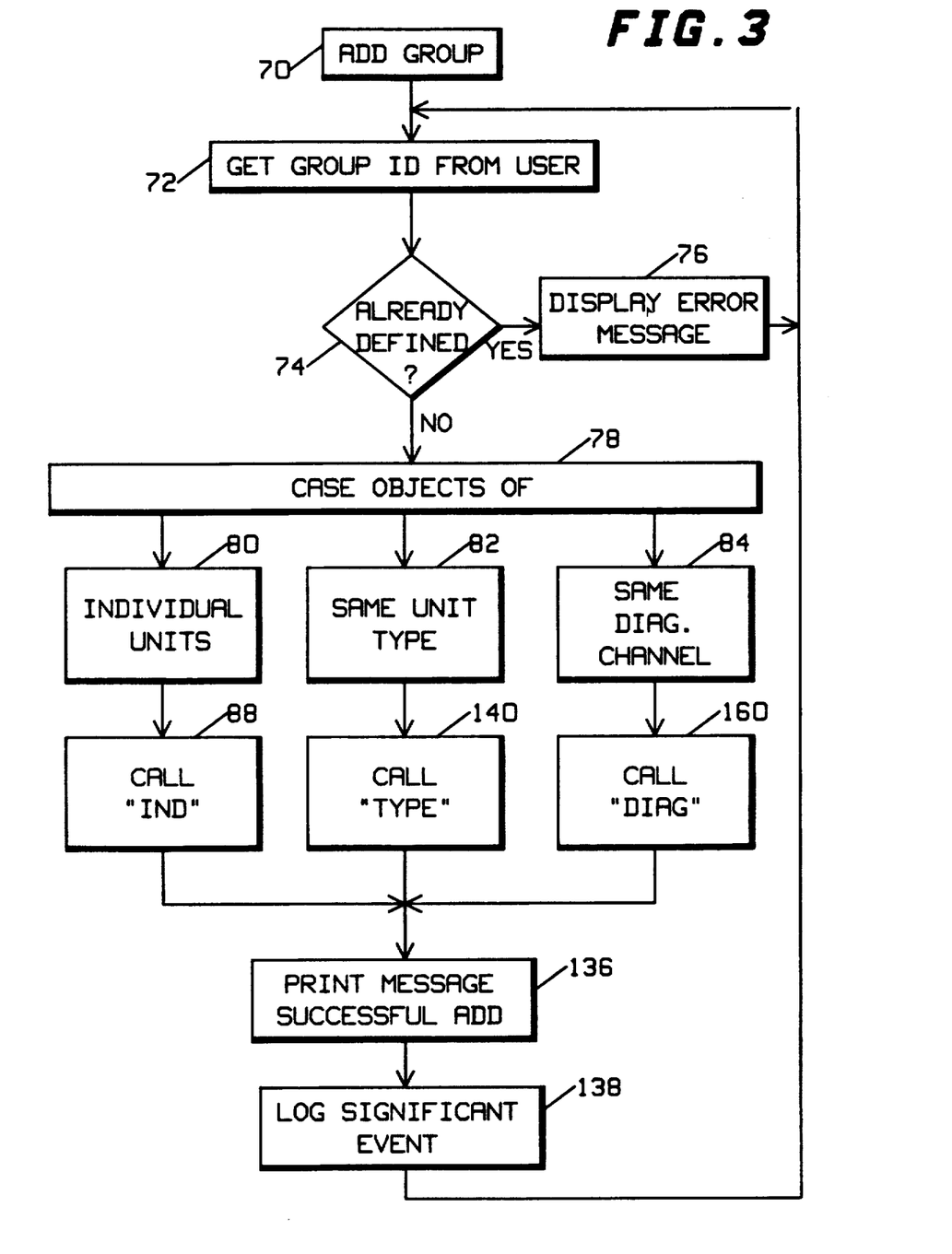
FIG. 3 shows a flow chart of the add group function.

Turning now to FIG. 3, a procedure for implementing the add group function is described in flow chart form which starts at label 70. The user is prompted for the group id at step 72 and the systems accepts entry of the group id from the user. At step 74, the system checks the group definition table of the database to determine whether or not the group id entered by the user is already defined as a group. If so, the system displays an error message at 76 and control returns to 72.

If the group id is not previously defined at 74, the user is prompted to determine whether individual units, units of the same type (e.g. manufacturer model), or units on the same diagnostic channel are to be used to form the group at 78. The user may then select either individual 80, same unit type 82 or same diagnostic channel 84. If individual 80 is chosen, the process calls a subroutine called IND herein at 88. Routine IND is described in conjunction with FIG. 4.

Figure 4:
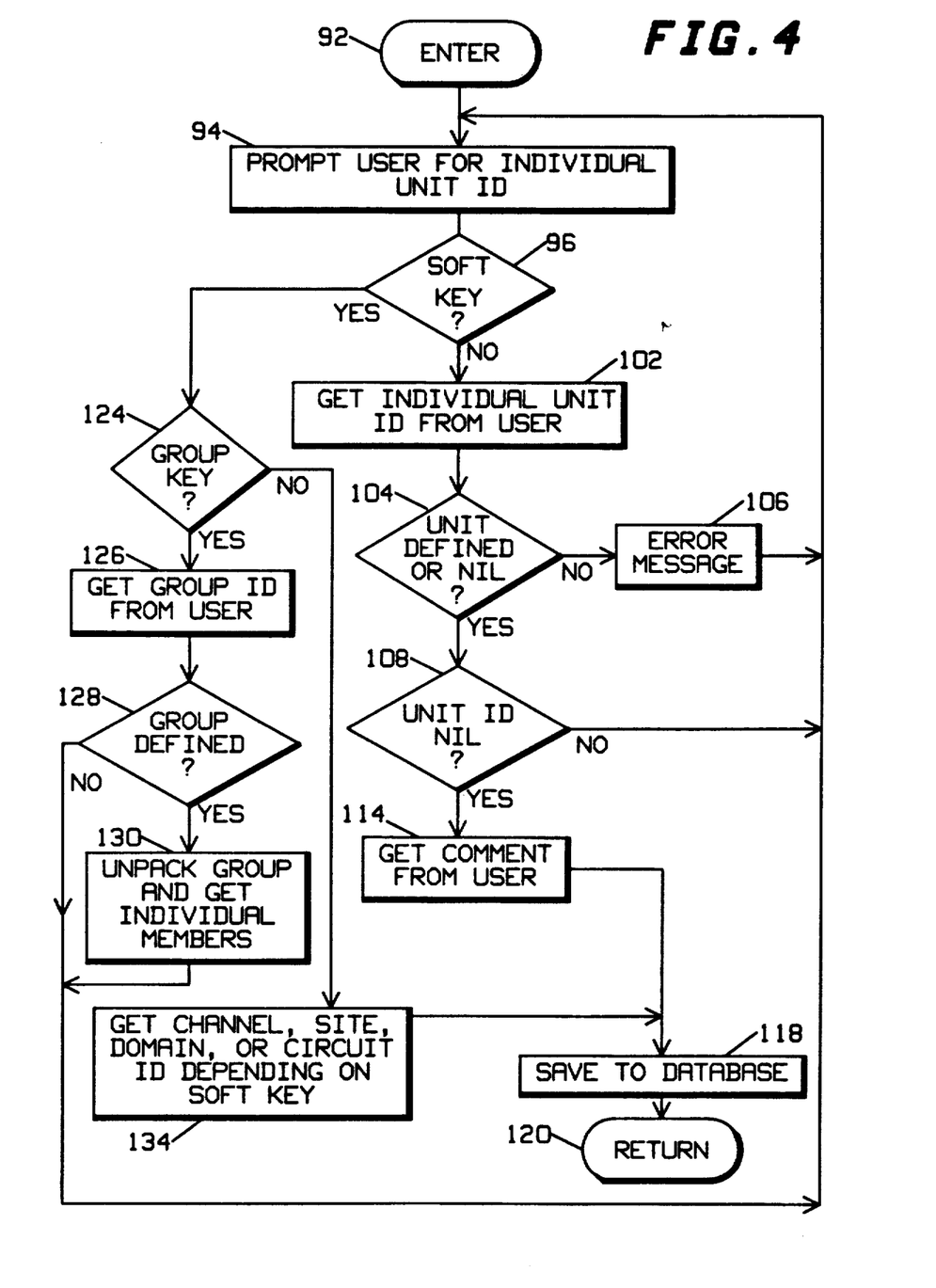
FIG. 4 is a flow chart of the IND routine.

Referring to FIG. 4, the routine is entered at 92 after which the user is prompted for an individual unit id at 94. At this point, the user may either enter the identification number (unit id) of an individual network object to begin adding units to the group being defined, or press a defined function key (soft key) on the console of terminal 12 to select from commonly required collectives. (Although such soft keys are used in the preferred implementation, the same function could be implemented using another layer of menus or the like.) At step 96, the system checks to see if a soft key has been elected. If not, control passes to 102 where the system prompts the user for the unit id of the unit to be added to the group. The unit id entered by the user is then inspected at 104 to determine if it is defined in the network management system 10's database or if no entry has been made by the user. If no, an error message is displayed at 106 and control passes to 94.

If the unit id is defined at 104 or if no entry has been made by the user, control passes to 108 to determine if no entry has been made. The user indicates that no more entries are to be made in the group by making a nil entry. If the unit id is not nil at 108, control passes to 94 to allow the user to enter more unit id's. If the entry is nil at 108, control passes to 114 where the user is permitted to enter a comment regarding the group he is setting up. Control then passes to 118 where the group definition table and the group member table of the database are updated with the information entered. The routine then returns at 120.

In TABLE 2, the entry of group omni-group would correspond to a group set up by entry of individual entries. When all entries are saved the system generates its own internal group id which in this case is shown as 103. In TABLE 3, the member type entry is used by the system as an indication that the unit id number corresponds to an actual identification number assigned to a physical unit in the network. For this example group, all of the members were manually entered and therefor any new members added to the group must also be manually entered. This can be automatically accomplished also as will be described below.

If a soft key was pressed at 96, control goes to step 124. A soft key could either represent a group, a channel, a site, a domain or a circuit in the preferred embodiment. If the key represents a group at 124, it means that the user wishes to create a new group from an existing defined group. Control then passes to 126 where the user is prompted for a group id. The group id is checked at 128 to see if it is on the group definition table. If not, control returns to 94. If so, the defined group is unpacked and each individual member is added to the new group at 130. Thus, if the group corresponding to the group id entered at 126 changes at a later date, the newly defined group's members will not automatically be updated to reflect that change. Control passes from 130 back to 94. Those skilled in the art will appreciate that in other embodiments the group's members could be unpacked at the time the group is addressed rather than the time of creation of the group without departing from the present invention.

If the soft key pressed at 124 is found not to represent a group, it must represent either a represent a channel, a site, a domain (each operator of a network management system is usually assigned a domain of objects to be responsible for management of), or a circuit. In this case, the information used to form the group when the group is addressed by the user is dynamic such that, for example, changes in objects on a particular circuit are reflected as a change in the group whenever the change is made. Control passes to 134 where the id information for the site, the channel, the domain or the circuit (depending on the soft key presses) is obtained from the user. This information is then saved to the database at 118 and the routine returns at 120.

Referring back to TABLES 2 and 3, group NEGROUP is defined using the site soft key as indicated by the member type identifier of 3 in TABLE 3. An unique code is assigned to each type of member so that the system knows that the unit id for this group does not actually represent a single unit but rather an id number pointing to the particular geographical site selected. In this manner, whenever the user uses this group, the site is unpacked at the time of use so that changes in equipment at the site are automatically reflected in the group.

Referring back to FIG. 3, when control returns to 88, it passes to 136 where a message is printed to the display indicating that a group was successfully added to the system. Control then passes to 138 where this event is logged to a significant event log which keeps track of such events. The log may be in the form of a computer file, a paper copy printed by printer 13 or both. Control then reverts back to 72.

Figure 5:
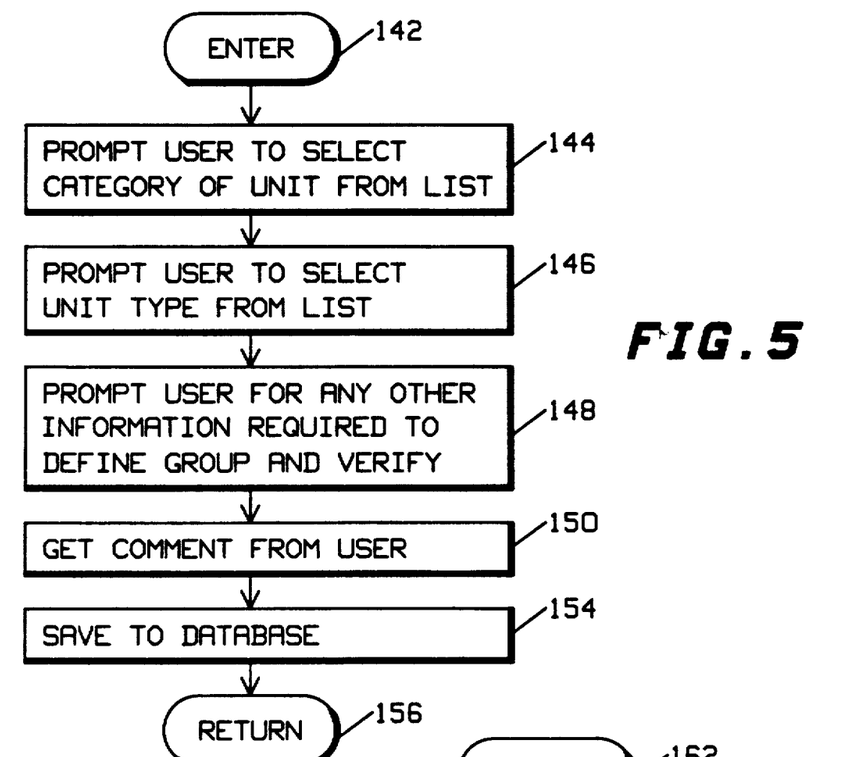
FIG. 5 is a flow chart of the TYPE routine.

If units of the same type are desired to form a group, at 82, a subroutine called TYPE herein is called at 140. This subroutine is described in conjunction with FIG. 5 with the routine being entered at 142. Control then goes to 144 where the user is prompted to select a category of units from a list. For example, the list may contain diagnostic modems, diagnostic multiplexers, restoral units, and diagnostic other. Other categories may also be set up as desired. After selection of one of the categories, the user is prompted at 146 to select a unit type from a list. In general unit type will be selected from a list of available manufacturer's models. If other information is required to complete the group definition, the user is prompted for it at 148. At 150, the user is prompted for a comment and the new group is saved to the database at 154. The routine returns at 156 where control passes to 136 as in the previous case.

Figure 6:
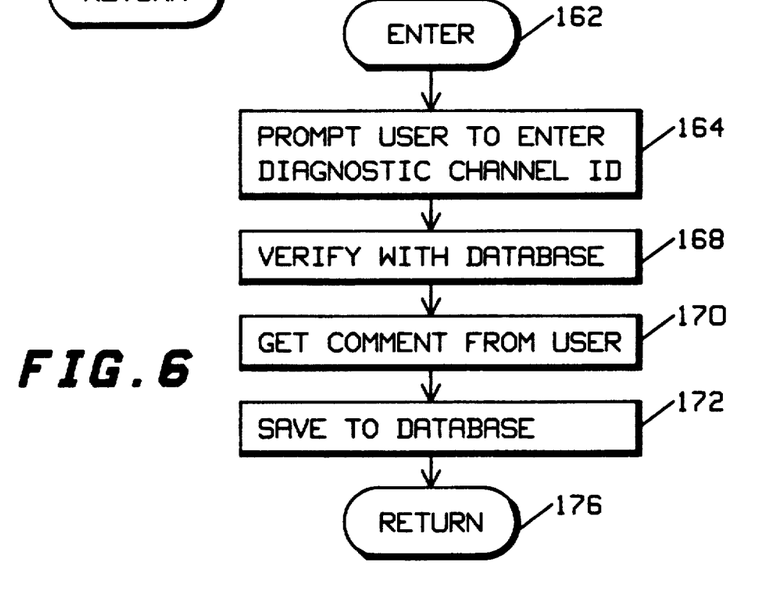
FIG. 6 is a flow chart of the DIAG routine.

If units on the same diagnostic channel (generally applicable to out of band diagnostic channel systems such as those manufactured by Racal-Milgo) are desired to form a group at 84, control passes to 160 where a routine referred to herein as DIAG is called. This routine is described in conjunction with FIG. 6. This routine is entered at 162 and at 164 prompts the user to enter the id of the diagnostic channel. This channel id is then verified with the database at 168 and the user is prompted for a comment at 170. At 172, the group is saved to the database tables and the routine returns at 176 to 160 as before.

Note that it is possible to define groups which do not have any members. This can be used to predefine groups which may be needed or filled at a later time.

Figure 7:
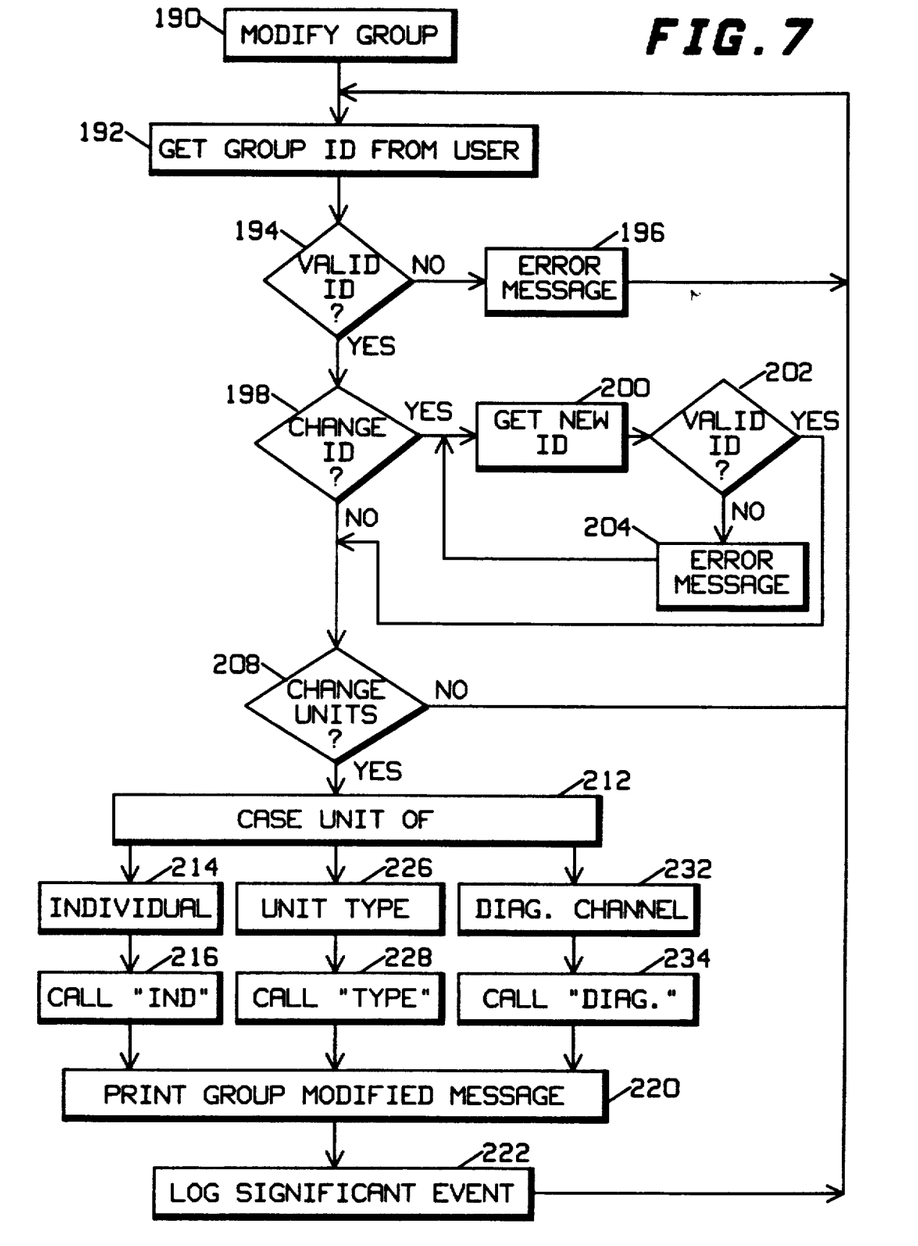
FIG. 7 shows a flow chart of the modify group function.

Turning now to FIG. 7, the modify group function is described. This procedure is entered at 190 where control passes to 192 which gets a group id to modify from the user. The validity of the group id is checked against the group definition table at 194 and if it is not valid, an error message is displayed at 196. Control then passes to 192. If the group id is valid at 194, the user is asked if he wishes to change the group id (the external group id) at 198. If yes, a new group id is obtained from the user at 200 and it is checked to see if it already exists at 202. If it does, it is invalid and control passes to 204 where an error message is displayed and control passes back to 200 until a valid group id is entered.

When a valid group id is entered, or if no change to the group id is desired, control passes to 208 where the user is asked if he wishes to change the units in the group. If not, control returns to 192. If so, the user may select individual, unit type or diagnostic channel at 212. If individual is selected at 214, control passes to 216 where IND is called to allow the user to enter individual units as previously described. When this is completed, a message indicating that the group has been modified is displayed at 220 and the event is logged at 222. Control then returns to 192.

If unit type 226 is selected at 212, control passes to 228 where routine TYPE is called as previously described. When the routine returns, control passes to 220 as in the previous case.

If diagnostic channel 232 is selected at 212, routine DIAG is called at 234 as previously described. When it returns, control passes to 220 as before.

Figure 8:
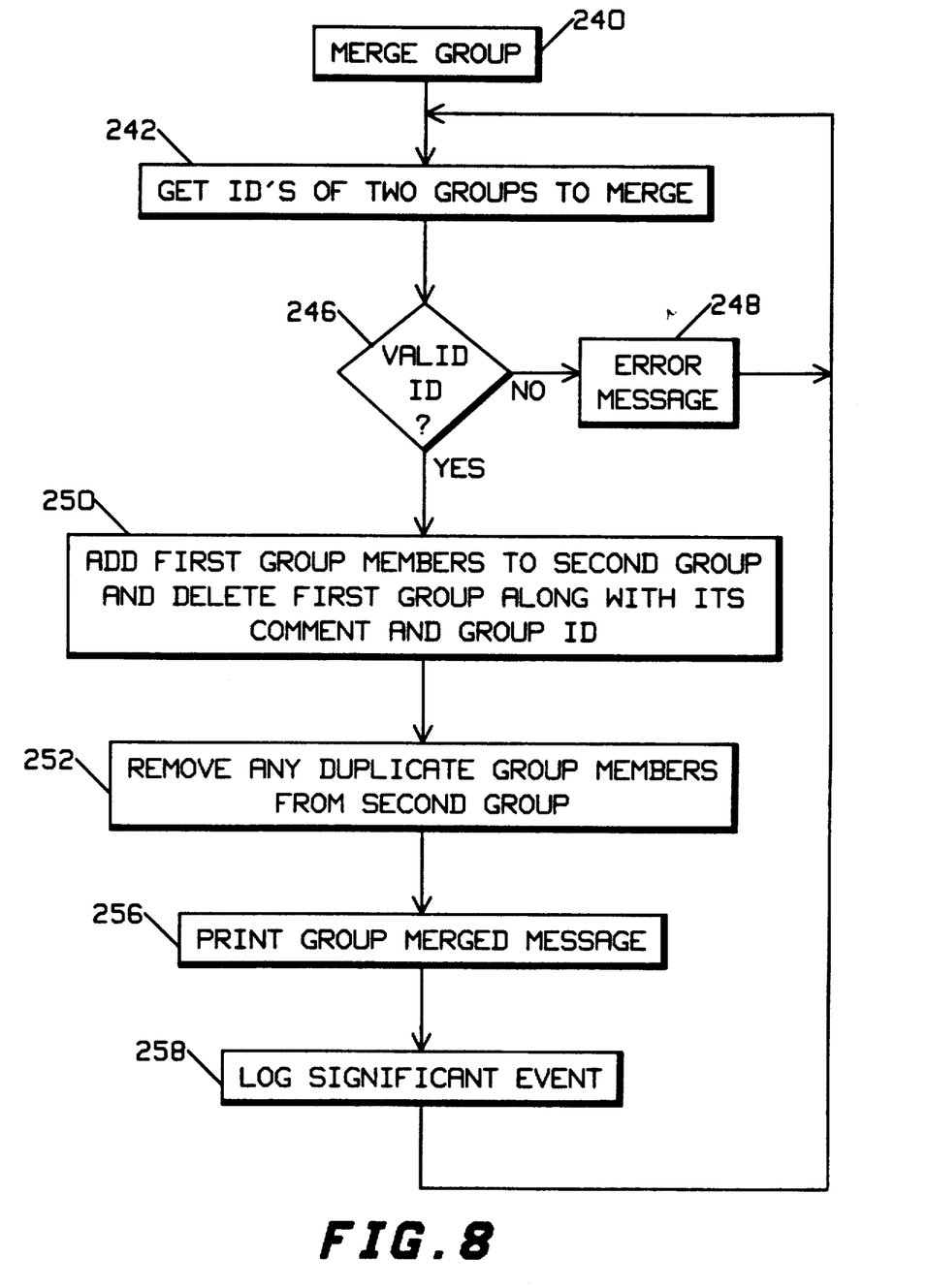
FIG. 8 shows a flow chart of the merge group function.

Turning now to FIG. 8, the merge group procedure is described. The procedure begins at 240 and passes control to 242 where the group id of two groups id obtained from the user. At 246 a validity check is carried out and if either group id is invalid, an error message is displayed at 248. If both group id's are valid, control passes to 250 where the members of the first group are added to the second group and the first group's group id, group members and comments are deleted from the group definition and group members tables. At 252, the second group's members are inspected to see if there are any duplicates. If so they are deleted and control passes to 256. At 256 a message is displayed indicating that the groups have been successfully merged and the event is logged at 258. Control then returns to 242.

Figure 9:
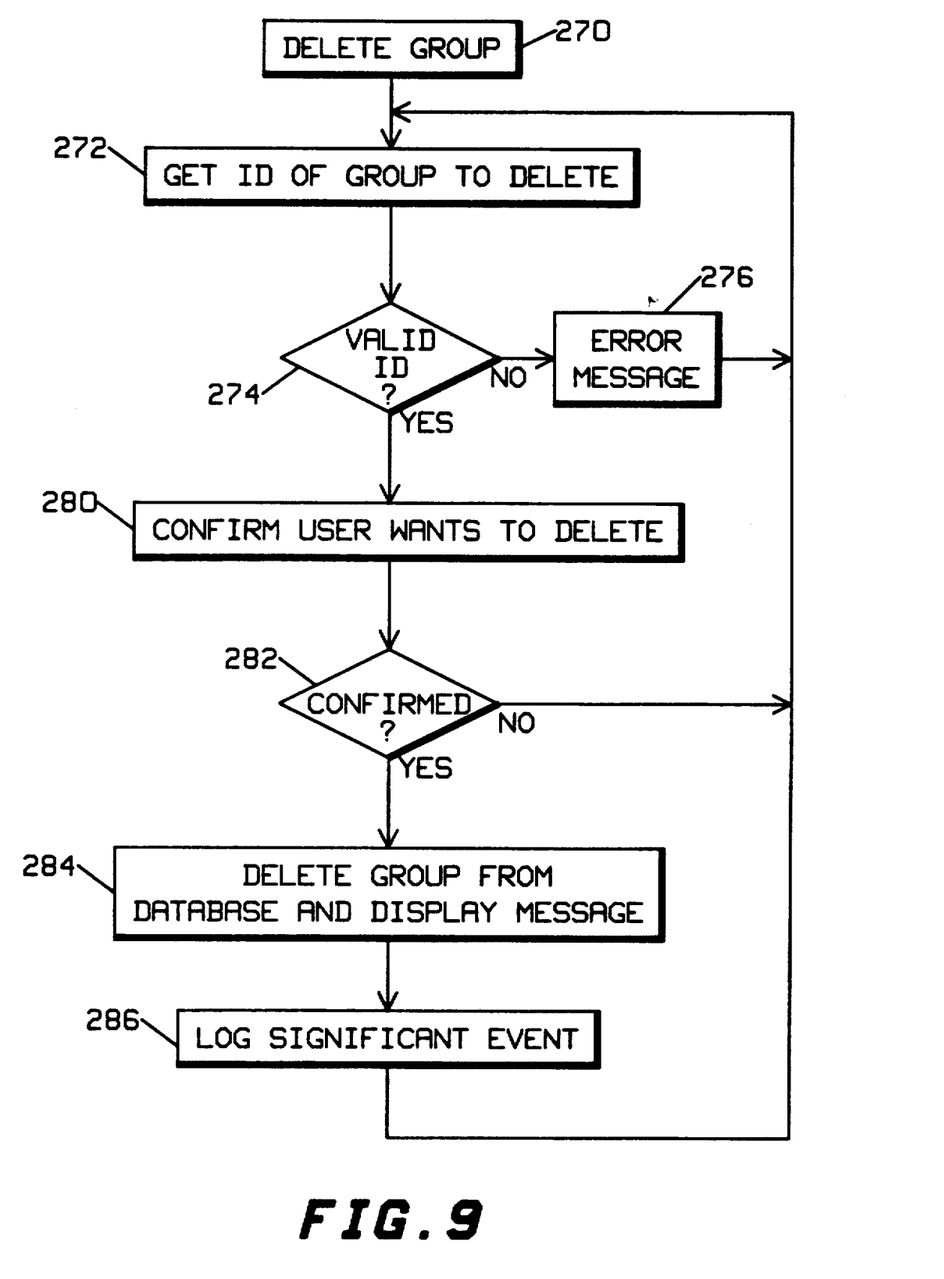
FIG. 9 shows a flow chart of the delete group function.

Turning now to FIG. 9, the delete group procedure is described. The routine is entered at 270 and control passes to 272 where the user is prompted for the group id of the group to delete. A validity check is carried out at 274 and if an invalid group id is detected an error message is displayed at 276 and control goes back to 272. If a valid group id is found at 274, the system confirms that the user wishes to delete the group at 280. If it is not confirmed at 282, control returns to 272. If it is confirmed by the user at 282, entries relating to the group are deleted from the group definition table and the group members table at 284 and a message is displayed indicating that the delete operation was completed successfully. Control then passes to 286 where the event is logged. Control then returns to 272.

Figure 10:
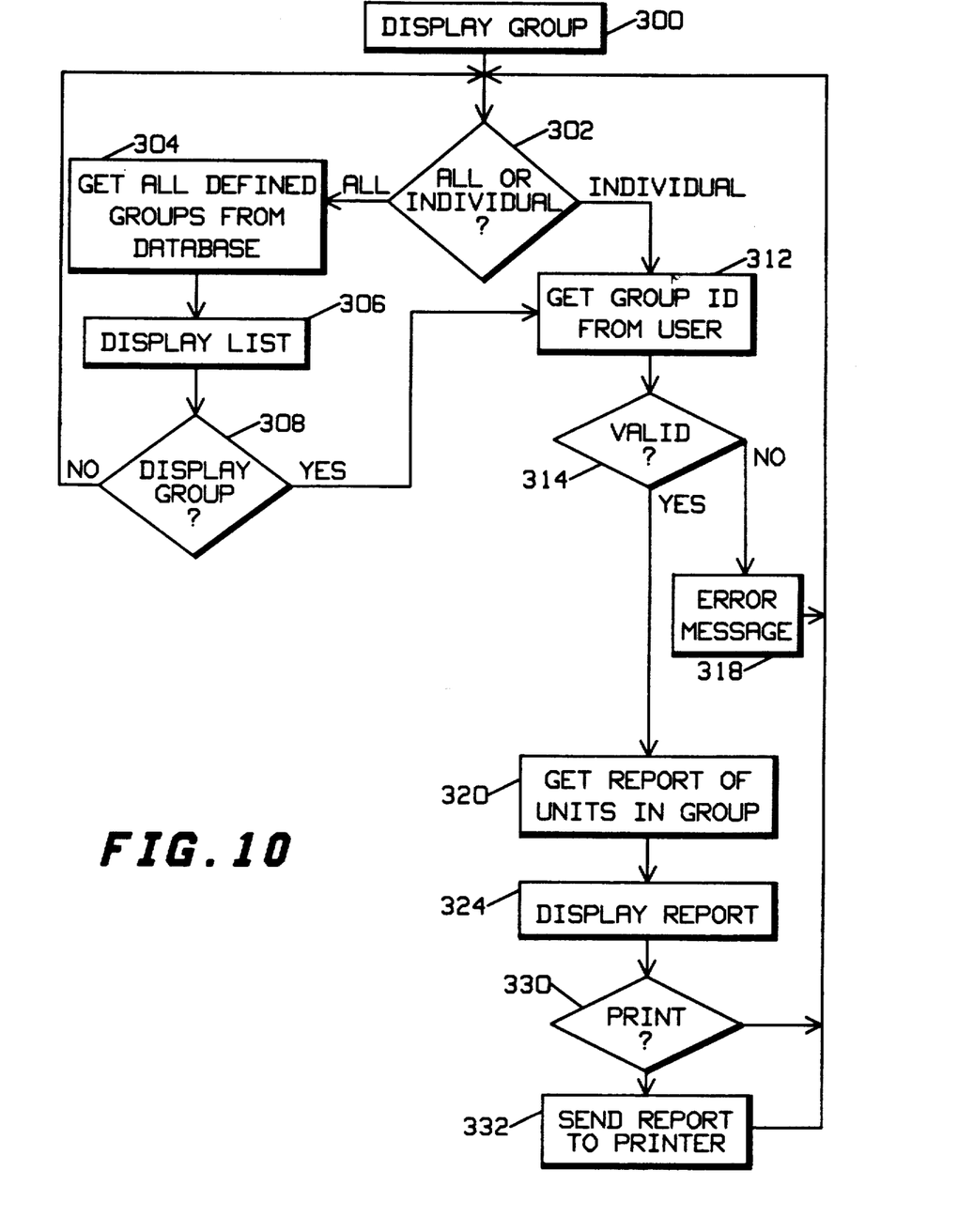
FIG. 10 shows a flow chart of the display group function.

Turning now to FIG. 10, the display group procedure is described and begins at 300 where control is passed to 302. At 302, the user is asked whether he wishes to display a list of all groups or a report on a specific group. If all groups is selected, all defined groups are obtained from the group definition table of the database at 304 and the list is displayed at 306. At 308, the user is asked if he wishes to display a particular group. If no, control returns to 302. If yes, the group id is obtained from the user at 312. If the group id is invalid at 314, an error message is displayed at 318 and control returns to 302. If the group id is valid at 314, control passes to 320 where a report is fetched from the database relating to the units in the group selected. This report is displayed at 324 and the user is asked if a printout is desired at 330. If not, control returns to 302. If so, the report is sent to the printer 13 at 332 and then control returns to 302.

Figure 11:
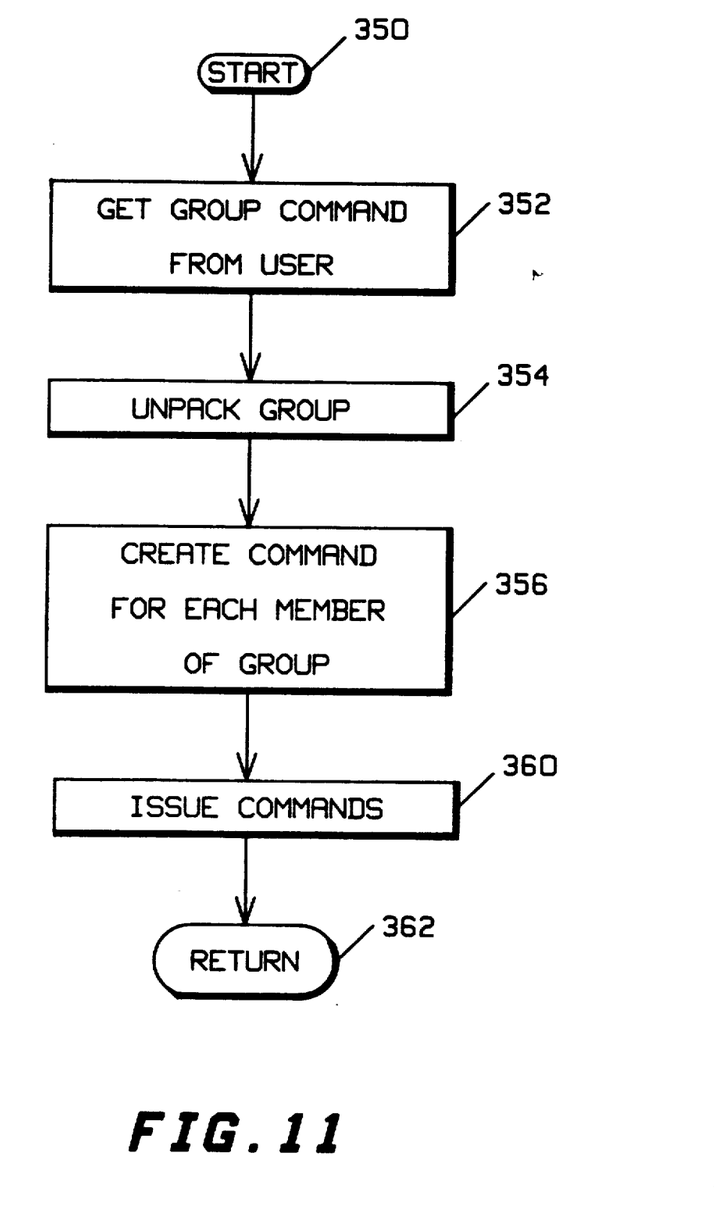
FIG. 11 shows a flow chart of the process for issuing group oriented commands in the network.

Those skilled in the art will appreciate that once the user has the ability to arbitrarily define groups, he can then perform diagnostic tests such as self tests or loopback tests on the group as an addressable entity without need to individually address each member thus facilitating many useful network management functions. In doing so, the process described by the flow chart of FIG. 11 is generally followed. The process begins at 350 after which the system gets a group oriented command from the user at 352. This can be accomplished in many known ways including prompted input or direct entry of network commands. In general, such group oriented commands will indicate a group as a destination for a particular command. The system then retrieves the appropriate information from the group definition table and the group member table at 354 and unpacks the group to identify the individual members. The group oriented command is then converted to an individual command directed toward each individual member of the group at 356. These individual commands are then issued to each object in the group at 360. The process returns at 362. Thus, commands directed to groups of objects can be issued rather than issuing individual commands to each member of the group. In fact, the issuer of such group oriented commands, such as loopback testing, need not even know exactly which objects form part of that group. Many variations of the present procedure are possible as will be apparent upon examination of the embodiment disclosed herein.

Thus it is apparent that in accordance with the present invention, an improved apparatus and method that fully satisfies the objectives, aims and advantages is set forth above. While the invention has been described in conjunction with specific embodiments, it is evident that many alternatives, variations, modifications and permutations will become apparent to those skilled in the art in light of the foregoing description. Accordingly, it is intended that the present invention embrace all such alternatives, variations, modifications and permutations as fall within the spirit and broad scope of the appended claims.

What is claimed as new and desired to be secured by Letters Patent is:

1. In a computer based data communications network management system for managing a plurality of network units disposed in a data communications network, a method for allowing a user to define a plurality of groups of said network units in a computer database stored in a computer for said network management system; each of said groups being defined according to any user defined criteria, said computer being located at a single location, the method comprising in combination the steps of:

each of said network units having a preassigned individual unit identifier;

said computer prompting said user for an external group name for one of said groups;

in response to said user inputing said group external group name, said computer creating an internal group name for said one group to be used in addressing said one group;

said computer repeatedly prompting said user for a member identifier identifying at least one member of said one group; said member identifier, in the case of said member being one of said network units, being said individual unit identifier for said one network unit; said member identifier, in the case of said member being a predefined collective of said network units, being a predefined collective name;

in response to said user inputing said member identifier, said computer adding said individual unit identifier to a list of said network units to be included in said one group, in the case of said member identifier being for one of said network units, and said computer adding to said list a plurality of said individual unit identifiers for said network units of said predefined collective name, in the case of said member identifier being for said predefined collective;

storing said list along with said internal name in said computer database;

in response to said user inputting a group command to said computer specifying said one group as a destination for said group command; said computer converting said group command to a plurality of individual commands, each said individual command specifying one of said network units which are members of said one group as a destination for said each individual command; there being one of said individual commands for each of said members of said one group; and said network management system transmitting each said individual command to one of said network units.

2. The method of claim 1, wherein said predefined collective of network units includes a preexisting one of said groups and said predefined collective name is a preexisting one of said group names.

3. The method of claim 1, further comprising the step of adding a new member to said one group by adding a member identifier for said new member to said database.

* * * * *